United States Patent

Squibb

[19]

[11] Patent Number: 5,893,119
[45] Date of Patent: *Apr. 6, 1999

[54] COMPUTER APPARATUS AND METHOD FOR MERGING SYSTEM DELTAS

[75] Inventor: Mark Squibb, Republic, Mo.

[73] Assignee: DeltaTech Research, Inc., Montreal, Canada

[*] Notice: The term of this patent shall not extend beyond the expiration date of Pat. No. 5,729,743.

[21] Appl. No.: 898,703

[22] Filed: Jul. 22, 1997

Related U.S. Application Data

[63] Continuation of Ser. No. 565,486, Nov. 30, 1995, Pat. No. 5,729,743, which is a continuation of Ser. No. 559,975, Nov. 18, 1995, abandoned.

[51] Int. Cl.⁶ .................................................. G06F 17/30
[52] U.S. Cl. .......................... 707/203; 707/1; 707/100; 707/200; 707/202
[58] Field of Search .............................. 707/1, 100, 200, 707/202, 203

[56] References Cited

U.S. PATENT DOCUMENTS

| | | | |
|---|---|---|---|
| 4,641,274 | 2/1987 | Swank | 364/900 |
| 4,807,182 | 2/1989 | Queen | 364/900 |
| 4,853,843 | 8/1989 | Ecklund | 364/200 |
| 4,912,637 | 3/1990 | Sheedy et al. | 395/619 |
| 5,131,012 | 7/1992 | Dravida | 375/108 |
| 5,218,605 | 6/1993 | Low et al. | 371/16.1 |
| 5,278,979 | 1/1994 | Foster et al. | 395/600 |
| 5,317,729 | 5/1994 | Mukherjee et al. | 395/600 |
| 5,317,731 | 5/1994 | Dias et al. | 395/608 |
| 5,347,653 | 9/1994 | Flynn et al. | 395/600 |
| 5,438,661 | 8/1995 | Ogawa | 395/157 |
| 5,446,884 | 8/1995 | Schwendermann et al. | 395/600 |
| 5,479,654 | 12/1995 | Squibb | 395/600 |
| 5,559,991 | 9/1996 | Kanfi | 395/489 |
| 5,581,755 | 12/1996 | Koerber et al. | 395/614 |
| 5,592,661 | 1/1997 | Eisenberg et al. | 395/600 |
| 5,729,743 | 3/1998 | Squibb | 707/203 |

Primary Examiner—Thomas G. Black
Assistant Examiner—Donald Min

[57] ABSTRACT

A computer apparatus and method for merging system deltas, and more particularly, to a computer apparatus and method for 1) merging a number of system deltas with a copy S of a system's files (primary input stream) to create a revised copy of a system's files (primary output stream), 2) merging a plurality of system deltas with one another to create a compiled system delta, 3) creating inverse system deltas, and 4) merging inverse system deltas as in 1) and 2), supra. The methods may be used to save, construct and/or retrieve current and historical system states. The apparatus and method may be used in conjunction with a computer backup process, version manager, or the like.

29 Claims, 10 Drawing Sheets

COMPUTER APPARATUS AND METHOD FOR MERGING SYSTEM DELTAS

CROSS-REFERENCE TO RELATED APPLICATIONS

This is a continuation of application Ser. No. 08/565,486 filed Nov. 30, 1995 (now U.S. Pat. No. 5,729,743). application Ser. No. 08/565,486 is a continuation of application Ser. No. 08/559,975 filed Nov. 18, 1995 (now abandoned). Both of these applications are hereby incorporated by reference for all that they disclose. This application also incorporates by reference U.S. Pat. No. 5,479,654 of Squibb entitled "Apparatus and Method for Reconstructing a File from a Difference Signature and an Original File", and U.S. Pat. No. 5,745,906 of Squibb entitled "Method and Apparatus for Merging Delta Streams to Reconstruct a Computer File".

REFERENCE TO MICROFICHE AND PAPER APPENDICES

This application also incorporates by reference the computer program listing contained in the attached microfiche and paper appendices. The microfiche appendix comprises 1 microfiche with 18 frames. The paper appendix comprises 101 pages.

BACKGROUND OF THE INVENTION

This invention pertains to a computer apparatus and method for merging system deltas, and more particularly, to a computer apparatus and method for 1) merging a number of system deltas with a copy of a computer system's files (primary input stream) to create a revised copy of a computer system's files (primary output stream), 2) merging a plurality of system deltas with one another to create a compiled system delta, 3) creating inverse system deltas, and 4) merging inverse system deltas as in 1) and 2), supra. The methods may be used to save, construct and/or retrieve current and historical states of a computer system's files. The apparatus and method may be used in conjunction with a computer backup process, version manager, or the like.

The above-referenced application to Squibb, Ser. No. 08/039,702, discloses a method and apparatus for producing a change list for an original and updated version of a computer file. The method and apparatus utilize a hash generator CPU to produce a token set for an original file. A comparator CPU later uses the token set and a windowing technique to identify and correlate the locations of coexistent pages in the original and updated files. The comparator CPU then uses the coexistent page information and the residue of the updated file (or original) to create a delta expressing the differences between the original and updated files. The delta is transmitted to another computer and combined with a backup copy of the original file to create a backup copy of the updated file. The original file and a series of deltas are used to retain historical file information in a cost effective manner.

The above-referenced application to Squibb entitled "Computer Apparatus and Method for Merging a Sequential Plurality of Delta Streams" discloses a computer apparatus and method for merging a sequential plurality of delta streams, wherein each delta stream represents a change to either a prior delta stream, an original data stream, or an updated data stream. The method and apparatus may be used to 1) merge a sequential plurality of delta streams with an original data stream to create an updated data stream, 2) merge a sequential plurality of delta streams to create a compiled delta stream, or 3) merge a sequential plurality of negative delta streams to retrieve a desired prior data stream. The method and apparatus may be used in conjunction with a computer backup process, version manager, or the like. In summary, a consumer process initiates a number of search requests, within a transaction chain corresponding to the sequential plurality of delta streams, for a number of data bytes to transfer to an updated data stream. The search requests may be fulfilled with data bytes provided by the last delta stream in the transaction chain capable of supplying data bytes, or if the sequential plurality of delta streams is incapable of fulfilling the search request, it may be fulfilled with data bytes provided by the original data stream. As the sequential plurality of delta streams is merged, a sequential plurality of negative delta streams may be generated, thus enabling reconstruction of a desired prior data stream.

Although the above apparatus and methods of Squibb provide unique advantages in performing backup operations, version management, and the like, especially when reading and writing to sequential media, they do not provide an efficient, nor appropriate, method of managing "system" events such as file creations, deletions, replacements, and duplications (clonings). For example, assume that the second system delta in a sequential plurality of twenty system deltas contains delta information indicating that file AZ was deleted. Processing file AZ through a twenty element transaction chain (hereinafter referred to as a "delta bridge") is a cumbersome way to acknowledge that file AZ was deleted by the second system delta, and consequently, all of its data was routed from an original copy of a system's files (original data stream) to an inverse system delta (negative delta stream) corresponding to the second system delta.

It is therefore a primary object of this invention to provide a computer apparatus and method for efficiently merging changes to a computer "system", and more particularly, a computer apparatus and method for 1) merging system deltas with a copy of a computer system's files (primary input stream) stored in a sequential storage media, or 2) merging system deltas with one another.

The prior art comprises three procedures for system backup and/or version control. The first is "full copy versioning." In a full copy versioning system, a system's files are initially copied to a backup repository. Revised files are transferred to the backup repository as incremental backups. An incremental backup comprises a complete set of data for each file in the system that has been modified, copied, moved, renamed, or otherwise changed. In addition to the data of changed files, an incremental backup comprises the data of any new file. A system directory tracks which file versions in the backup repository comprise the current versions of a system's files. Full copy backup is currently the method of choice due to the fact that full and incremental backups may be saved to a sequential media (which is dramatically cheaper than seekable media).

Unfortunately, full copy versioning has several disadvantages. First, full and incremental backups require is a significant amount of storage space. For example, a 0.5% change in one Gigabyte of mixed file types may be spread through 15% of the mixed files, while a 0.5% change in a one Gigabyte database may be spread throughout 100% of the database's files. An incremental backup can therefore be 15–100% of the size of a full backup. For a database or similar system, full copy versioning may represent little savings over performing consecutive full system backups.

Second, although full and incremental backups may be stored as streams in a sequential media, the totality of files representing a particular system state are not stored in the sequential media as a "continuous" stream. Thus, if it is desired to reconstruct a system's files (even a most current version of the system's files), the desired versions of the system's files must be sought out from a myriad of full and incremental backups. As is well known in the art, sequential media is not easily seekable.

Third, due to the size of full and incremental backups, and the great amount of data to be managed by a backup repository, it is difficult, if not impossible, to merge incremental system backups with an original full system backup. As a result, a significant amount of duplicated data is stored within a backup repository, and management of the data can become an overwhelming task. It is therefore desirable to repeat full system backups on a periodic basis thereby reducing the amount of stored data to be managed. However, replacing incremental system backups with a new full system backup increases the number of I/O operations required of a backup repository, and erases historical system data.

Fourth, since the periodic full and incremental backups contain much duplicated (unchanged) data, physical storage requirements are immense, and media costs are high. However, despite the fact that a significant amount of duplicated data is saved in a full copy versioning system, system redundancy (or even file redundancy) does not exist. Though most of the data in an incremental backup may be duplicative of data contained in other full or incremental backups, only one copy of a particular version exists (a system or file version can only be retrieved from a single storage means, and not from either one of a redundant storage means). Archiving the already large amount of duplicative data makes system redundancy a very unattractive prospect.

The second known method of version control is commonly referred to as "revision control." Revision control systems are used to store detailed information concerning the changes made to computer source code. Source code changes are stored as deltas in an online seekable library. When a source code version is required, a base version is retrieved to disk, and the appropriate deltas are merged with it. An advantage of RCS is the ability to store deltas (only the changes to files), and merge particular deltas to construct either a prior or future system version. However, problems still remain. A first disadvantage of revision control is that it requires a seekable storage media. Furthermore, data (source code) must often be stored in a specific format (e.g., newline delimited) for efficient operation of the system. This often creates inefficiencies when revision control is used in conjunction with non-text files. Additionally, revision control is limited to use with small to medium size systems due to the fact that 1) online storage libraries create excessive seekable media storage costs, and 2) revision control delta merging is iterative, requiring an excessive number of I/O operations to merge many system deltas. Furthermore, the online accessibility requirement of a revision control system does not allow for system redundancy.

A third method of system versioning (backup) is "single entity versioning." Single entity versioning is a variant of revision control. However, single entity versioning differs from revision control in that it uses pointers to retrieve particular instances of a system data element (file). Storage media must therefore be seekable. On a large scale, single entity versioning has the same disadvantages as revision control.

It is therefore a further object of this invention to provide a computer apparatus and method wherein data can be directly retrieved from, and recorded to, a sequential storage media.

It is yet another object of this invention to provide a computer apparatus and method which do not require seeking within a sequential media.

It is also an object of this invention to provide a computer apparatus and method which allow for backup of large computer systems, with minimal physical storage requirements and costs.

It is another object of this invention to provide a computer apparatus and method which operate using deltas, thereby allowing the best data compression and the simplest version management.

A further object of this invention is to provide a computer apparatus and method which allow rapid retrieval of prior or future system versions with a minimum number of I/O operations.

Another object of this invention is to provide a computer apparatus and method which eliminate the need for periodic full system backups.

An additional object of this invention is to provide a computer apparatus and method which eliminate data duplication within a single storage means (e.g., a backup repository), but allow for cost efficient storage of data in independent and redundant storage means.

Yet another object of this invention is to provide methods of creating and merging inverse system deltas, wherein the merging of system deltas or inverse system deltas may be used to retrieve a prior or future version of a system's data.

SUMMARY OF THE INVENTION

In the achievement of the foregoing objects, the inventor has devised a computer comprising a system filter for merging a number of system deltas with a primary input stream (comprising system data), in a single pass, to build a primary output stream (comprising revised system data). The system filter may comprise a primary input; a primary output; and a number of base filter elements. The number of base filter elements correspond to the number of system deltas, and each of the base filter elements has a system delta input. If more than one base filter element exists, each of the number of base filter elements links to one another to form a sequence of base filter elements between the primary input and primary output of the system filter.

Associated with the system filter, the inventor has devised a method, to be implemented by a programmable computer, for merging a number of system deltas with a primary input stream to build a primary output stream. The primary input stream comprises a primary input stream directory. The first step in the method comprises setting up a system filter. The next step comprises processing each element of a physical element set through the system filter, in an order dictated by the primary input stream directory. Either before or after the previous step, each element of a new-in-scope element set is processed through the system filter.

Using the above method and apparatus, backup or version data can be directly retrieved from, and recorded to, a sequential storage media. This results in significant savings in required physical storage media, and enables the building of cost effective, large scale backup repositories.

Furthermore, by storing data and delta information as streams, and processing the information in a stream order, the method and apparatus eliminate the need to seek within a sequential media.

The method's use of system deltas, rather than incrementals, allows for greater data compression and simpler version management within a backup repository.

Since system deltas are easily merged with a primary input stream, prior or future system versions may be rapidly retrieved using a minimum number of I/O operations.

Additionally, the method's efficient management of data and delta information allows for implementation of cost effective redundant storage units.

These and other important advantages and objectives of the present invention will be further explained in, or will become apparent from, the accompanying description, drawing and claims.

BRIEF DESCRIPTION OF THE DRAWINGS

An illustrative and presently preferred embodiment of the invention is illustrated in the drawing in which.

DESCRIPTION OF THE PREFERRED EMBODIMENT

Figure 1:
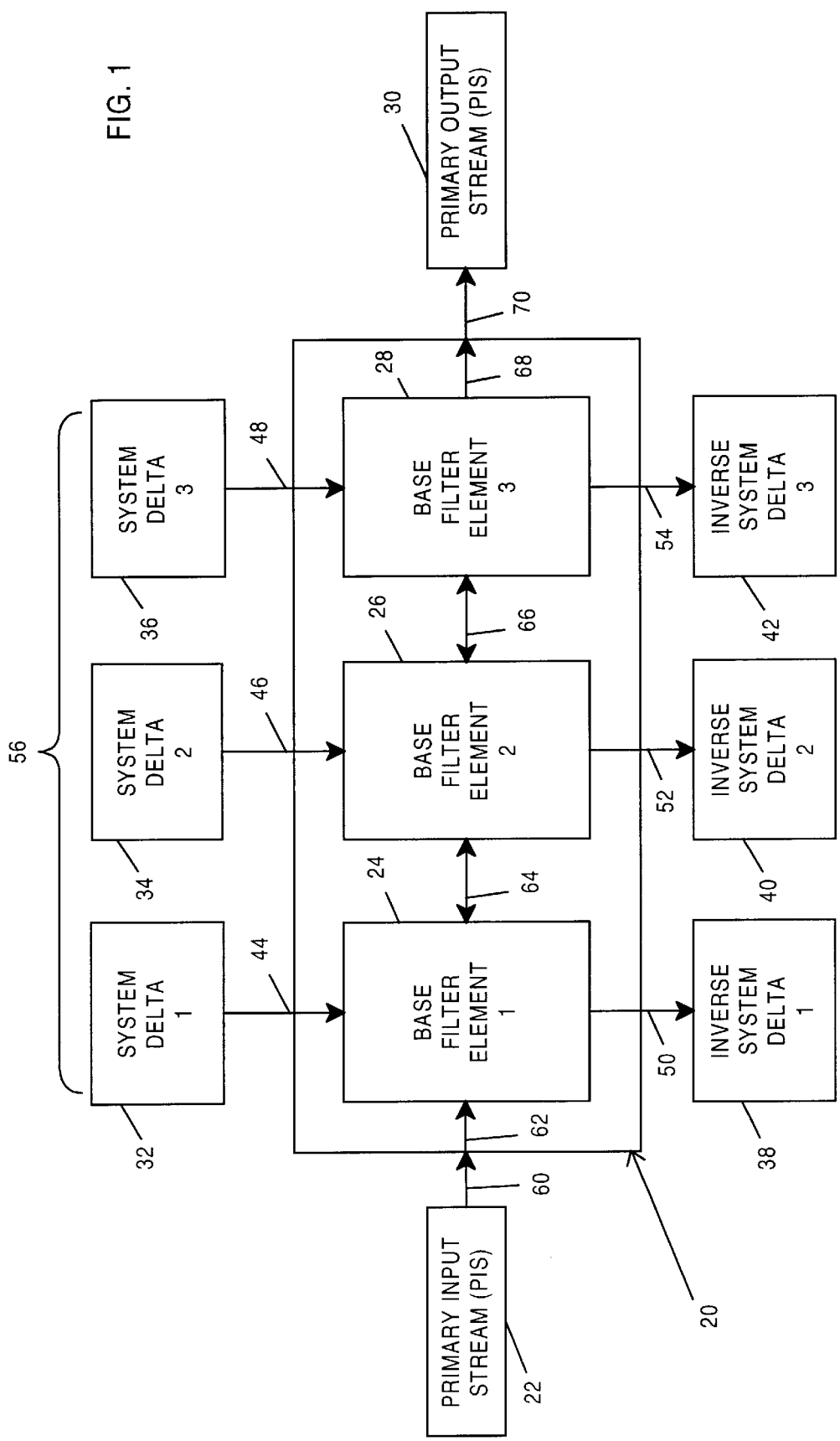
FIG. 1 is a schematic of a system filter for merging system deltas.
Figure 11:
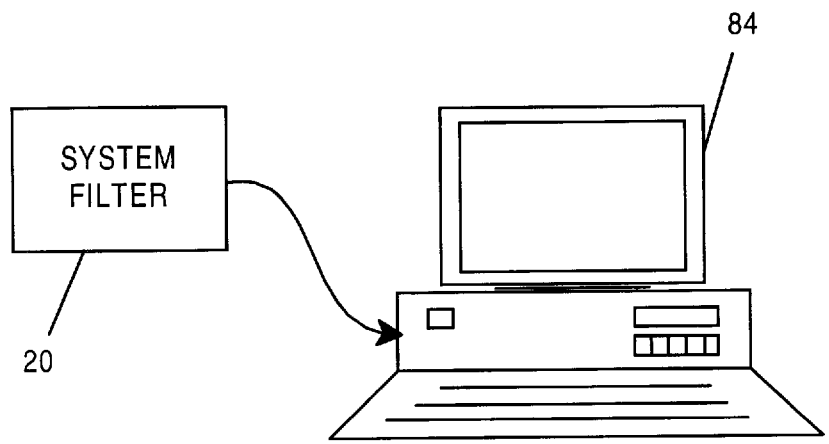
FIG. 11 shows the system filter of FIG. 1 embodied in a special purpose programmable computer.
Figure 12:
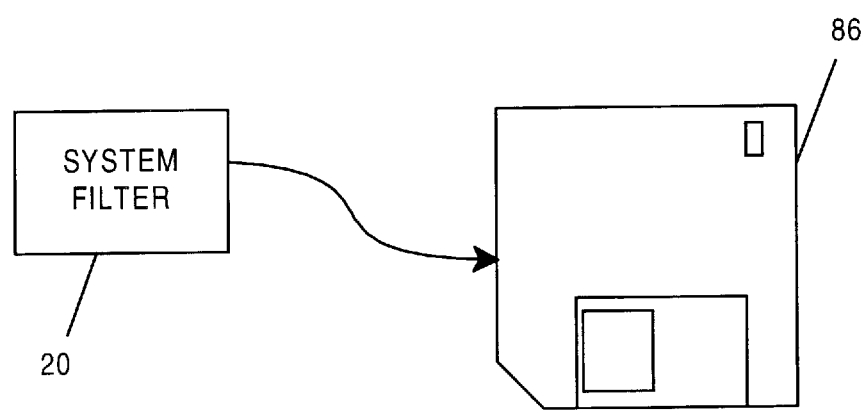
FIG. 12 shows the system filter of FIG. 1 embodied as an element of a software package stored on a floppy disk.

A schematic of a computer implemented system filter 20 for merging a number of system deltas 32, 34, 36 with a primary input stream 22, in a single pass, is shown generally in FIG. 1, which may comprise a primary input 60; a primary output 70; and a number of base filter elements 24, 26, 28, corresponding to the number of system deltas 32, 34, 36, wherein each of the number of base filter elements 24, 26, 28 has a system delta input 44, 46, 48, and if more than one base filter element 24, 26, 28 exists, each of the number of base filter elements 24, 26, 28 links 62, 64, 66, 68 to one another to form a sequence of base filter elements 24, 26, 28 between the primary input 60 and primary output 70 of the system filter 20. The computer implemented system filter 20 may be embodied in a special purpose programmable computer 84 (FIG. 11), or as an element of a software package stored on a physical storage media apart from a computer (e.g., a floppy disk 86). See FIG. 12.

A method to be implemented by a programmable computer for merging a number of system deltas 32, 34, 3G with a primary input stream (copy of a computer system's files) 22 to build a primary output stream (revised copy of a computer system's files) 30, wherein said primary input stream 22 is associated with a primary input stream directory, is shown generally in the flow charts of FIGS. 2–8, which may comprise the steps of setting up a system filter 102; processing each element of a physical element set through the system filter 20, in an order dictated by the primary input stream directory; and either before or after the previous step, processing each element of a new-in-scope element set through the system filter 20.

Having thus described the computer implemented system filter 20 and method for merging system deltas in general, the apparatus 20 and method will now be described in further detail.

Figure 2:
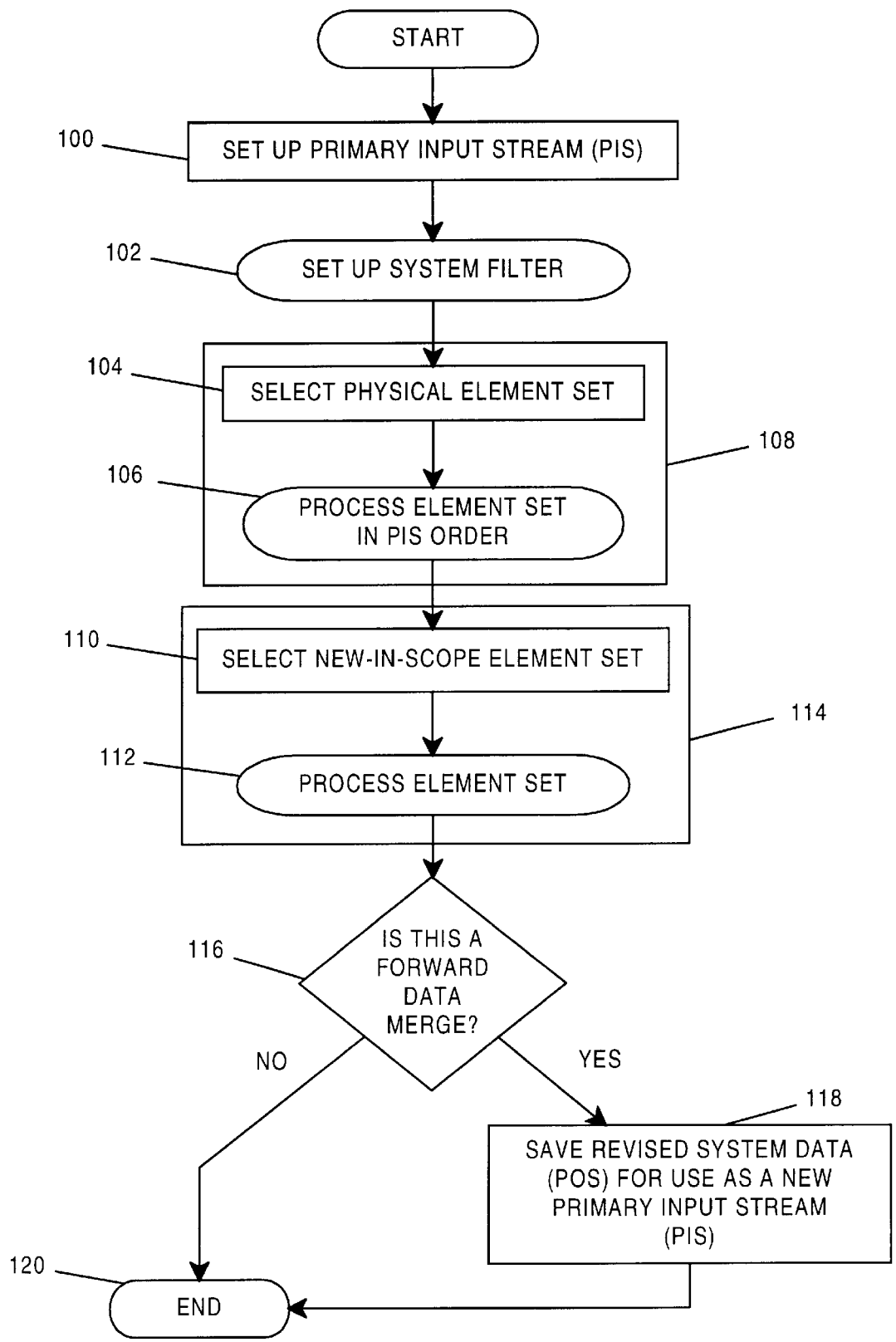
FIG. 2 is a flow of operations for a method for merging system deltas.

A preferred embodiment of the method starts with the FIG. 2 flow chart. To begin, a primary input stream (PIS) 22 must be set up 100. A primary input stream 22 comprises a data stream (PIS data stream) and a directory (PIS directory).

A PIS data stream is a stream of data elements comprising the information (contents) of a computer system. A computer system may comprise a database, a collection of user files, an operating system, or any other collection of information (presumably files) comprising the information of a computer system. A data element is a series of bytes comprising a logical entity within a system, usually a file. Stream refers to the fact that elements have a sequential, non-overlapping relationship.

A PIS directory comprises an ordered listing of the individual elements (data elements) which collectively form the PIS data stream. A PIS directory may be 1) merged with a PIS data stream as a number of headers preceding each PIS data element, 2) stored as a single header at the beginning of a PIS data stream, or 3) stored as a separate logical entity, apart from, but associated with, a PIS.

Preferably, the components of the PIS 22 are stored on a sequential media (like a magnetic tape) so as to save physical storage media costs. However, the components of the PIS 22 may also be stored on a seekable media (i.e., CD-ROM, floppy disk, hard drive, or the like), without affecting the operation of the method.

Setting up the PIS 22 comprises selecting and loading its components. A selected PIS 22 may comprise information relating to a most recent copy of a computer system's data (a recent full backup of a system, or a system backup created through a most recent system merge), or a copy of a system's data as it existed at some earlier point in time. Loading a PIS 22 involves locating the beginning of the PIS's information on a physical storage media so that the components of the PIS 22 (PIS directory, PIS data, and other general information about a PIS) are ready to be read (played) from beginning to end.

Figure 3:
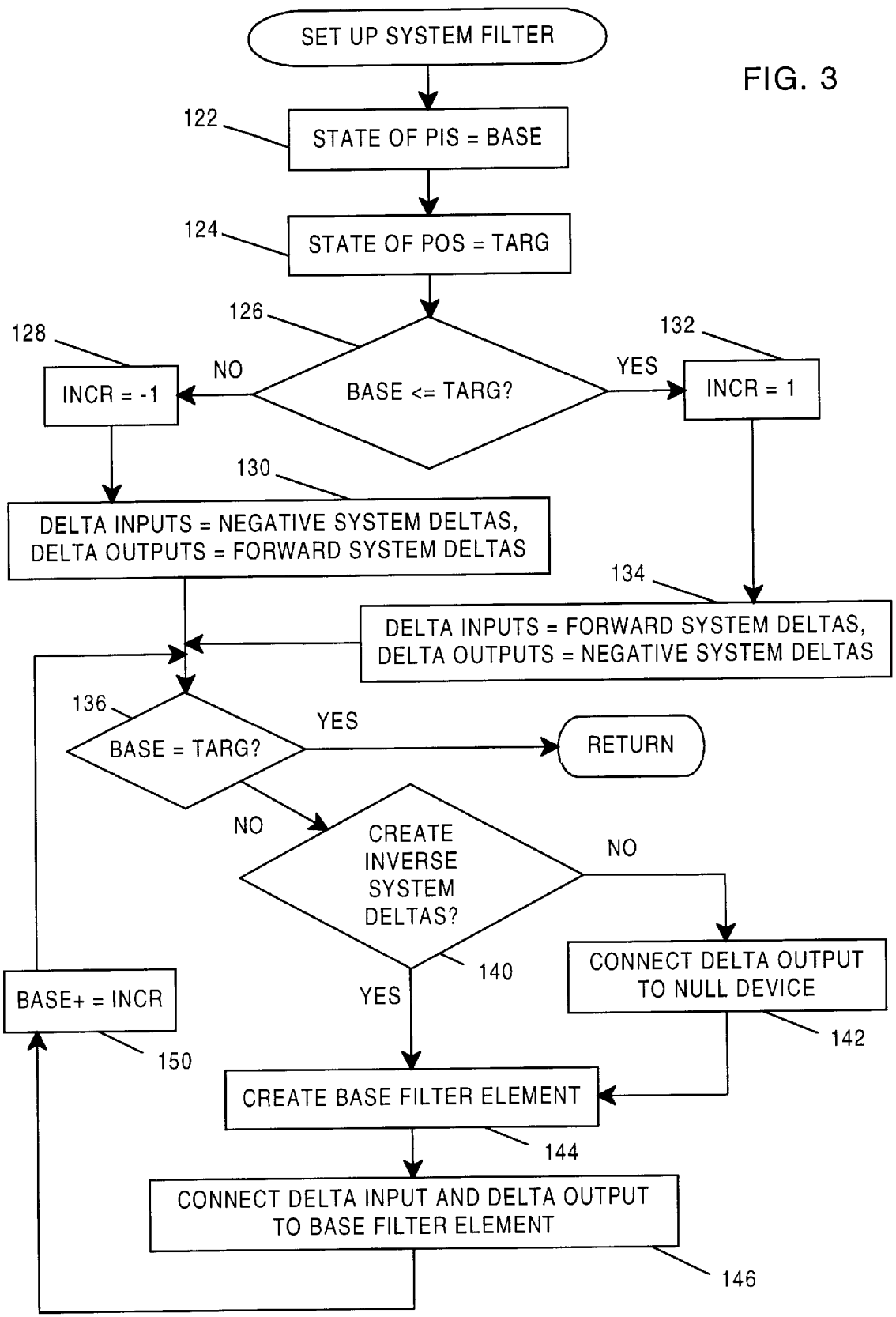
FIG. 3 is a flow of operations used by the method of FIG. 2 in setting up a system filter (as shown in FIG. 1)

After setting up the PIS 22, a system filter 20 must be set up 102. A flow of operations for setting up a system filter 20 is shown in FIG. 3, and the resulting system filter 20 can be seen in FIG. 1. A system filter 20 is an apparatus which may be used to merge a number of system deltas 32, 34, 36 with a PIS 22 to create a primary output stream (POS) 30. Like the PIS 22, the POS 30 comprises a POS data stream and a POS directory. Similar in respect to the PIS 22, the components of the POS 30 are preferably stored on sequential media.

System filter 20 setup 102 begins with a determination of system filter scope 56, 74 and sense 76, 78. In broad terms, filter scope 56, 74 identifies a range of system deltas including delta and/or new data information falling between a base state and a target state, where the base state 122 is the state of the PIS 22, and the target state 124 is the state of the POS 80. More specifically, filter scope 56, 74 identifies an accumulation of delta elements which are to be merged with a PIS 22.

Before proceeding with the description of system filter 20 setup, the difference between a "system delta" and a "system state" should be further defined. A system delta 32, 34, 36 is a collection of delta and/or new data information (collectively referred to as "delta elements"). A delta represents a change to a logical system entity such as a file. New data refers to a data element which has been added to a system's contents. A system state (or version) is a representation of a system' files as they existed at some discrete point in time. A system state may be created by merging a copy of a system's files (a PIS 22), and any changes (delta and/or new data information) to those files which take place before a discrete point in time. In one embodiment of the method, the delta and/or new data information of a system delta 32, 34, 36 is collectively created at a discrete point in time, and thus represents system changes which coincide with a discrete system state. In another embodiment of the method, creation of the delta and/or data information of a system delta 32, 34, 36 is event driven. Thus, the creation of a new system file may trigger the creation of a new data element, and the saving of an updated file may trigger the creation of a delta corresponding to the updated file. The events driving the creation of delta and/or new data information may or may not coincide with a discrete system state. As a result, a system delta 32, 34, 36 can represent a continuum of changes occurring between system states (i.e., it can have an "elemental scope"), rather than the changes to a system at a given system state. Furthermore, a system delta 32, 34, 36 may comprise more than one delta element corresponding to any given system data element.

The manner in which system deltas 32, 34, 36 are created has an affect on the determination of filter scope 56, 74. If system deltas 32, 34, 36 represent a continuum of system changes, the state of a PIS 22 or POS 30, 80 may fall somewhere within the elemental scope of a system delta 32, 34, 36, and consequently, only that delta and/or new data information of a system delta 32, 34, 36 which falls between the base and target states of a system filter 20 will be merged with a PIS 22.

Figure 9:
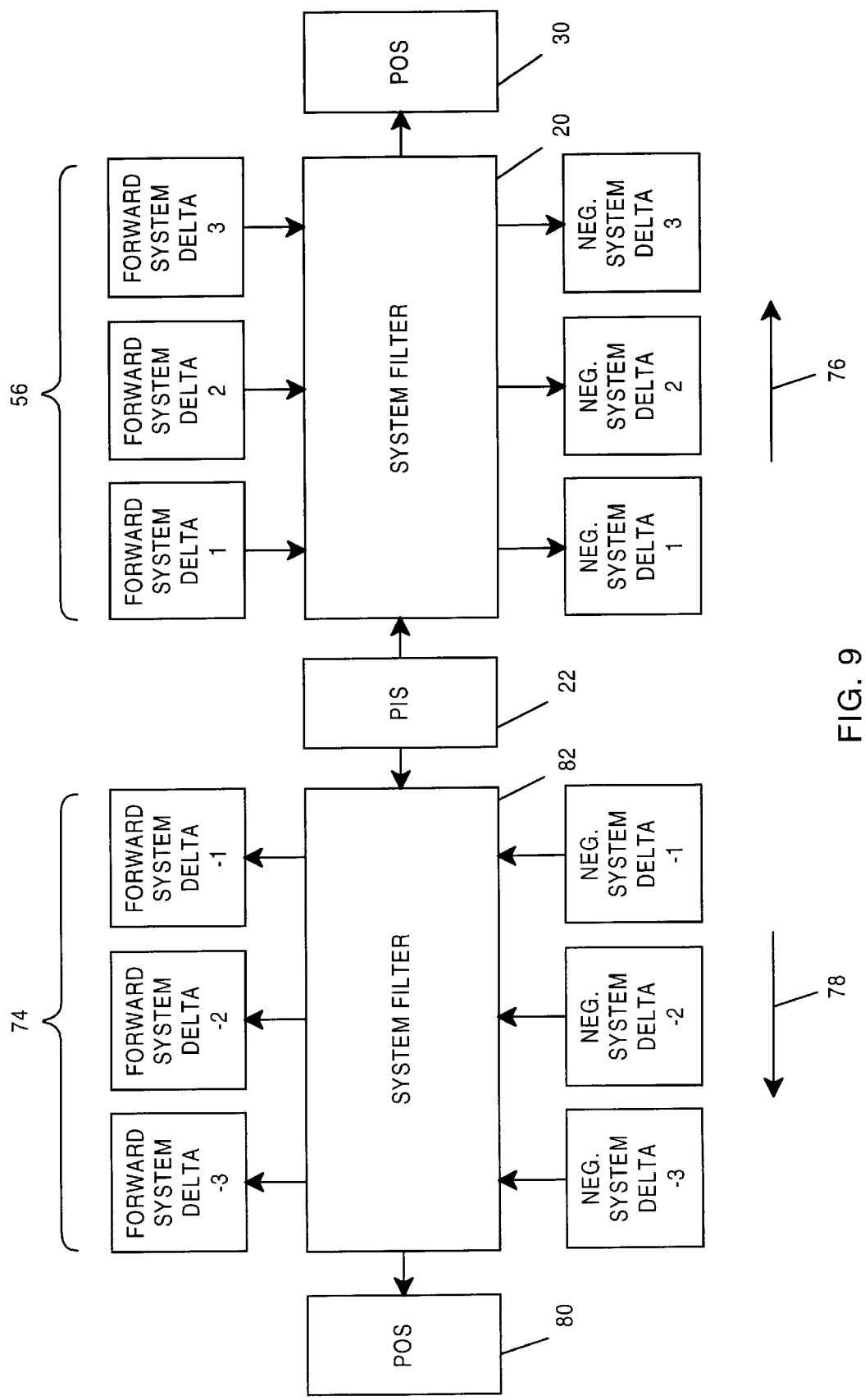
FIG. 9 is a schematic showing forward and negative system filters thereby demonstrating a system filter's scope and sense.

For examples of filter scope 56, 74 and sense 76, 78, refer to FIG. 9. If BASE is less than or equal to 126 TARG (INCR=1) 132, the filter scope 56 and sense 76 will identify a system filter 20 which merges forward system deltas (a forward merge) between the base (BASE) and target (TARG) states in an effort to build a POS 30 representing a future state of the computer system. If BASE is greater than 126 TARG (INCR=–1) 128, the filter scope 74 and sense 78 will identify a system filter 82 which merges negative system deltas (a negative merge) between BASE and TARG in an effort to build a POS 80 representing a prior state of the computer system. One should note that forward and negative system deltas are inverses of each other.

Once filter scope 56, 74 and sense 7G, 78 have been determined, an identification of the system filter's 20, 82 inputs 44, 46, 48, 60 and outputs 50, 52, 54, 70 may begin. As shown in FIG. 1, a system filter 20 may comprise a primary input 60, a primary output 70, and a number of system delta inputs 44, 46, 48 corresponding to the number of system deltas 32, 34, 36 falling within the system filter's scope 56. A system filter 20 may also comprise system delta outputs 50, 52, 54, capable of generating 140 a number of inverse system deltas 38, 40, 42 corresponding to the number of system deltas 32, 34, 36 serviced by the system filter's system delta inputs 44, 46, 48. As earlier stated, the inverse of a forward system delta is a negative system delta, and vise-versa. In a forward system merge 134 (wherein forward system deltas are the delta inputs and negative system deltas are the delta outputs), the creation 140 of inverse system deltas 38, 40, 42 provides a number of negative system deltas which may be used in retrieving an earlier system state (i.e., used in conjunction with a system filter 82 having a negative sense 78 to build a POS 80 which antedates the PIS 22). In a negative merge 130 (wherein negative system deltas are the delta inputs and forward system deltas are the delta outputs), the creation 140 of inverse system deltas 38, 40, 42 provides a method of recreating a number of forward system deltas 32, 34, 36 which might have been destroyed or corrupted. If an inverse path is not desired 142, as may often be the case when merging a number of negative system deltas, the system delta outputs 50, 52, 54 may be connected to null devices (not shown).

The next step in system filter 20 setup comprises creation 144 of a number of base filter elements 24, 26, 28 within the system filter 20. Each base filter element 24, 26, 28 of a system filter 20 services a single system delta input 44, 46, 48, and if it exists, a single system delta output 50, 52, 54. The base filter elements 24, 26, 28 are created for the purpose of consuming data from a system filter input 44, 46, 48, and routing the data consumed to one or more of the system filter's outputs 50, 52, 54, 70. In order to properly route data, the base filter elements 24, 26, 28 must be referentially linked 62, 64, 66, 68 between the system filter's primary input 60 and primary output 70. For example, a base filter element 24 servicing a system delta 32 representing a first set of changes to a PIS 22 would form 1) a link 62 to the system filter's primary input 60, and 2) if no other base filter elements exist, a link to the system filter's primary output 70, otherwise 3) if other base filter elements 26, 28 exist, a link 64 to a child base filter element 26. A child base filter element 26 is one which services a system delta 34 representing a next set of changes to a PIS 22. Each base filter element 24, 26, 150 in turn links 64, 66 its child base filter element 26, 28 until no child exists 136 and a link 68 is made to the system filter's primary output 70.

After setting up a system filter 20, a set of elements to be processed through the system filter 20 must be selected 104, 110. There are two types of element sets. The first type is the physical element set. The elements of the physical element set are those which exist in the PIS data stream and appear as entries in the PIS directory. Physical elements are understood to exist outside of, and prior to, a system filter's scope 56. The second type of element set is the new-in-scope element set. The new-in-scope element set comprises those elements with lifetimes beginning within the scope 56 of the system filter 20 (note: an element's lifetime begins with its creation and ends with its deletion). The data of a new-in-scope element will exist in a system delta 32, 34, 36 within the system filter's scope 56, and each new-in-scope element will appear as an entry in a new-in-scope directory created by the system filter 20. Although the new-in-scope directory is an ordered directory, its order is dictated by a combination of the order of new data elements in the system deltas 32, 34, 36, and preference.

Figure 4:
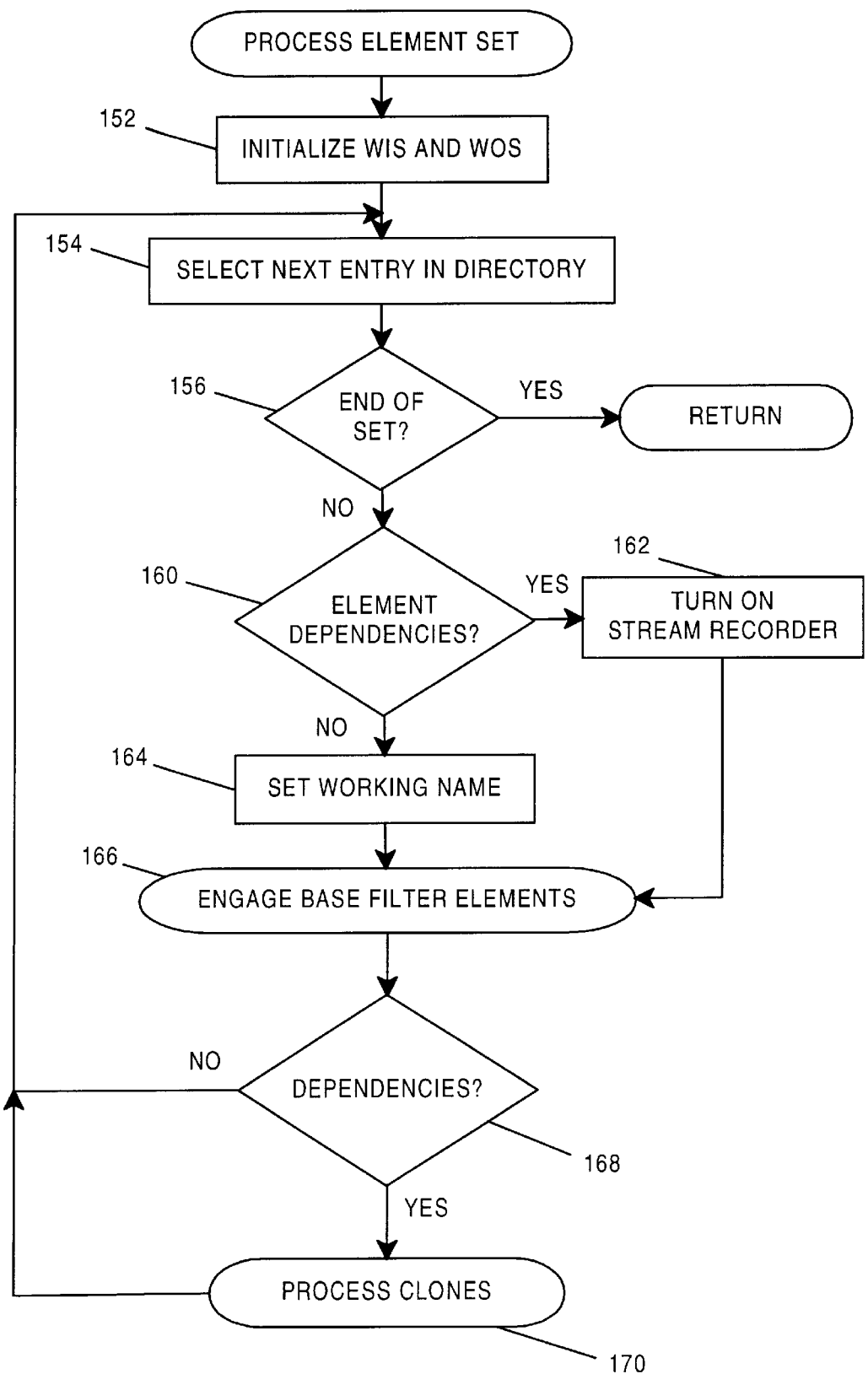
FIG. 4 is a flow of operations used by the method of FIG. 2 in processing an element set.

The elements of the physical and new-in-scope element sets are processed in a similar manner through consecutive calls 108, 112 of the Process Element Set steps of FIG. 4. It makes no difference which element set is processed first, and thus the "select and process" element blocks 108, 114 of FIG. 2 can be interchanged.

The steps of processing an element set (FIG. 4) and processing an element within the set (FIG. 5) are closely related. On a macro scale, processing each element of an element set comprises engaging those filter elements 24, 26, 28 which are required for the processing of a particular element. If the cumulative information of a system delta 32, 34, 36 lies entirely outside the lifetime of an element, the base filter element 24, 26, 28 servicing that system delta 32, 34, 36 will not be engaged during the processing of the element, as it can in no way affect the element's data. An important aspect of filter engagement is the redirection of a working input stream (WIS) and a working output stream (WOS). The WIS and WOS are used to identify the particular filter input and output which are engaged for the processing of a single element (i.e., the active input and output of the system filter 20). The WIS will coincide with the data of an element to be processed, and the WOS will coincide with a location to which the data element (possibly having been merged with delta elements as it was routed through one or more engaged base filter elements 24, 26, 28) will be written. Having given an overview of element and element set processing, the details of these procedures follow.

Processing an element begins with an initialization 152 of the WIS and the WOS. Initially, the WIS and WOS are set to coincide, respectively, with the primary input 22 and primary output 30 streams (i.e., set to coincide with the general direction of data flow).

Each element of an element set is processed in the order dictated by the element set's directory 154. Note that the name of the element to be processed may be referred to as the "working name" 164. Alternatively, the new-in-scope directory can be dispensed with, and new-in-scope elements can be processed by propagating a request through the delta inputs 44, 46, 48 of the base filter elements 24, 26, 28 for all new-in-scope elements which the system deltas 32, 34, 36 can provide.

The processing of an element requires three steps, 1) engaging filter elements within the lifetime of the element 166, 2) redirecting the WIS and WOS 164 in response to the filter elements engaged 178, 182, 184, 188, and 2) either copying the WIS to the WOS 202, or processing an element through the filter elements engaged between the WIS and WOS 204. These steps are described in FIGS. 5–7 and are discussed in further detail below.

Since a particular redirection of the WIS and WOS only has meaning within the context of processing a single element, the WIS and WOS must be reset 210 (re-initialized) after each element is processed. Additionally, paths created through the system filter 20 during the processing of an element must be deleted 210 after the element has been processed. After all of the elements in one set have been processed 156, the elements of the other set are processed.

Each piece of delta and/or new data information contained in a system delta 32, 34, 36 corresponds to a particular delta transaction type. When a filter element is engaged, the WIS and WOS are redirected in response to the transaction type which corresponds to the delta and/or new data information being consumed by a filter element. Before describing the mechanics of redirecting the WIS and WOS, the possible transaction types which a filter element may encounter should be defined. The possible transaction types are: new, update, delete, replace, clone, and no change. Definitions of these transaction types are as follows:

NEW: An element appears in a system for the first time, thus beginning its lifetime.
UPDATE: An element has been modified through additions, deletions or both.
DELETE: An element no longer appears in a system, thus ending its lifetime.
REPLACE: An element has gone through a DELETE and a NEW transaction since the creation of a previous system delta, and the element's new data differs from its old data.
CLONE: An element has been copied, and the data of an element is now referenced by more than one name.
NO CHANGE: An element's data has not changed.

Concurrently with any of the above transaction types, a change in an element's metadata may occur. Metadata includes any information about an element which is not included in the element's data. For example, metadata may include an element's name, state or date stamp, access information, and additional bookkeeping information. Metadata can change in conjunction with any of the above transaction types (even in conjunction with a NO CHANGE transaction). Although its tracking is largely inconsequential with regard to data merging mechanics, changes in metadata occurring in conjunction with some of the above transaction types (particularly changes to name and state information) will be discussed below. In handling metadata, it is important to note that a simple rename of an element (i.e., a NO CHANGE to data) should not result in the element's data appearing more than once in the POS 30. In other words, a stream of system data should not comprise duplicated data.

Figure 5:
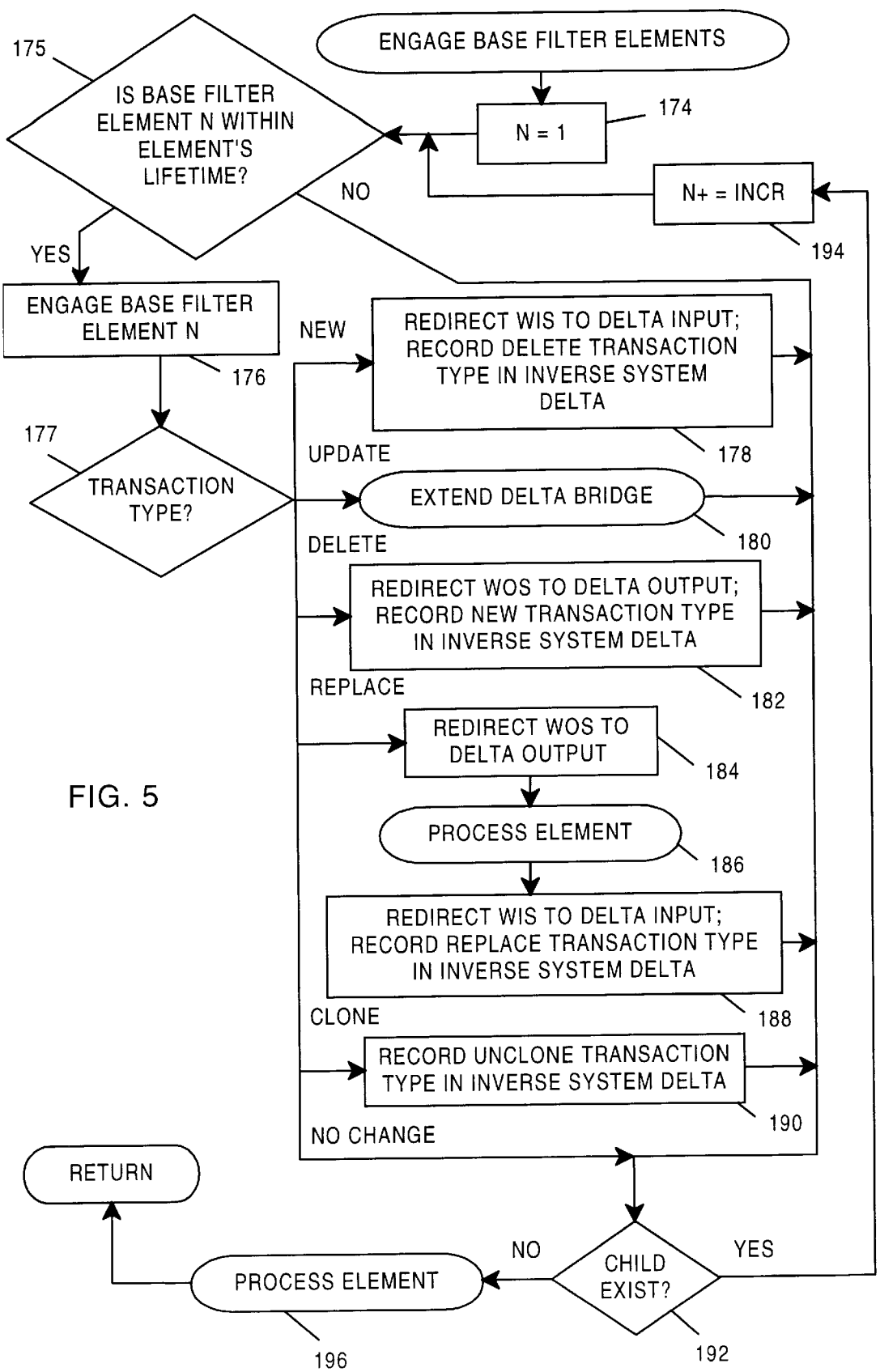
FIG. 5 is a flow of operations used by the method of FIG. 2 in setting up a working input stream (WIS) and working output stream (WOS)
Figure 6:
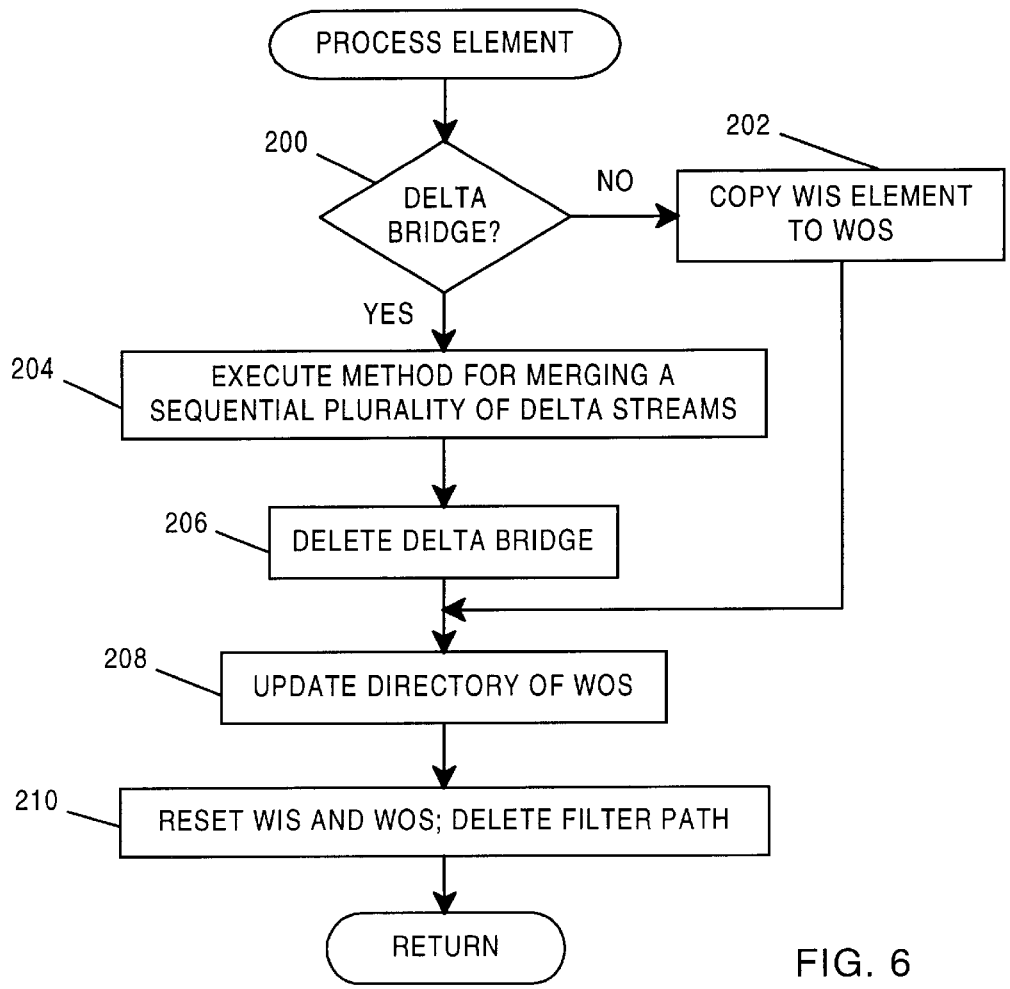
FIG. 6 is a flow of operations used by the method of FIG. 2 in processing an element.
Figure 7:
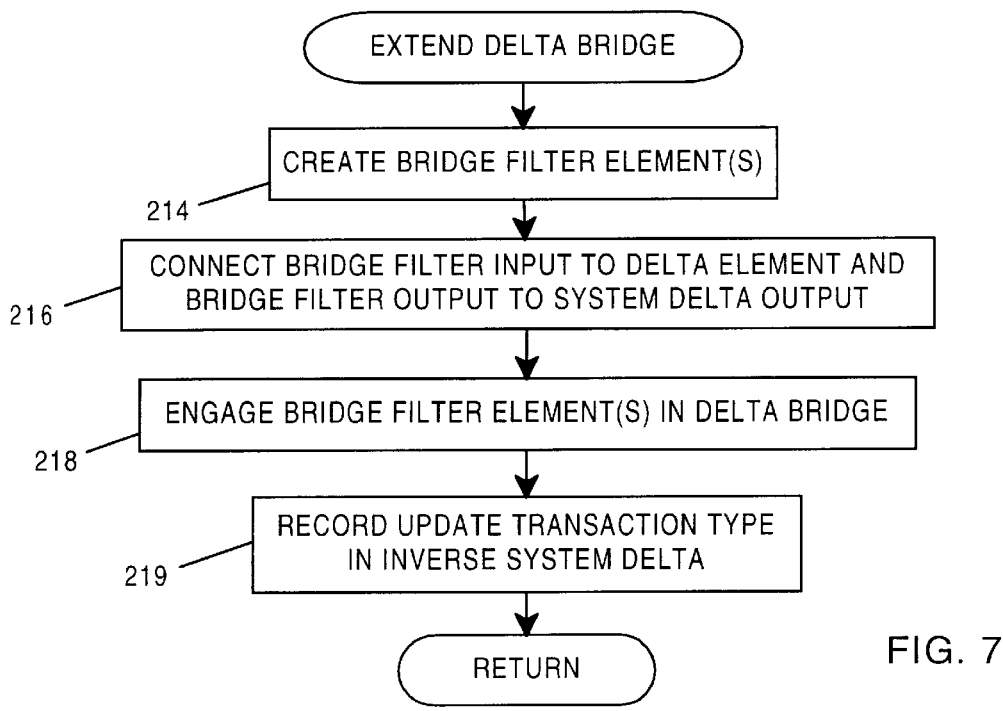
FIG. 7 is a flow of operations used by the method of FIG. 2 in extending a delta bridge for an element.

The process of engaging base filter elements, and redirecting the WIS and WOS in response thereto, is described in the flow chart of FIG. 5. The WIS and WOS are redirected for each element to be processed through the system filter 20. Redirection of the WIS and WOS first comprises engaging 176 a base filter element 24, 26, 28 which is within the lifetime of an element 175. Linked base filter elements 24, 26, 28 are sequentially examined 174, 194, in the order in which they are linked, to determine whether they are within an element's lifetime 175. As briefly mentioned in an earlier paragraph, an element's lifetime begins with its creation (a NEW transaction type) and ends with its deletion (a DELETE transaction type). Therefore, base filter elements 24, 26, 28 of a system filter 20 which are within an element's lifetime are sequentially engaged, and the WIS and WOS are redirected accordingly, until 1) every base filter element linked between the system filter's primary input 60 and primary output 70 has had an opportunity to redirect the WIS and/or WOS, or 2) a base filter element servicing a system delta containing a DELETE transaction for an element has been engaged 192.

The WIS and WOS redirection which occurs in response to a given transaction type 177 is as follows:

If the transaction type is NEW, the WIS is redirected to coincide with the system delta input 44, 46, 48 of the base filter element 24, 26, 28 servicing the NEW transaction type 178. Additionally, a DELETE transaction type is recorded by the same base filter element's system delta output 50, 52, 54.

If the transaction type is UPDATE, a delta bridge is extended 180. If a system delta 32, 34, 36 comprises only one delta element corresponding to an element which is being processed, extending a delta bridge 180 comprises configuring the base filter element 24, 26, 28 servicing the UPDATE transaction to function as a bridge element. However, when a system delta 32, 34, 36 comprises more than one delta element which corresponds to an element being processed (as is possible when delta creation is event driven, and a file is updated more than once during the elemental scope of a system delta 32, 34, 36), extending a delta bridge 180 comprises 1) creating (or configuring) 214 a bridge filter element for each of the delta elements of a system delta 32, 34, 36, 2) connecting each of the delta elements to the input of a bridge filter 216, 3) connecting the bridge filters' outputs to the system delta output 50, 52, 54 of the most recently engaged base filter element 24, 26, 28, and 4) sequentially engaging each of the created bridge filter elements in a delta bridge 218. See FIG. 7. The U.S. patent application of Squibb entitled "Computer Apparatus and Method for Merging a Sequential Plurality of Delta Streams" describes the process of creating and configuring bridge filter element (transaction elements) in more detail. An UPDATE transaction type will also result in an inverse UPDATE transaction type being recorded in the inverse system delta 38, 40, 42 corresponding to the last engaged base filter element 24, 26, 28.

If the transaction type is DELETE, the WOS is redirected to coincide with the system delta output 50, 52, 54 of the base filter element 24, 26, 28 servicing the DELETE transaction type 182. Additionally, a NEW transaction type is recorded by the same base filter element's system delta output 50, 52, 54.

If the transaction type is REPLACE, the WOS is redirected to coincide with the system delta output 50, 52, 54 of the base filter element 24, 26, 28 servicing the REPLACE transaction type 184, and the element is processed 186 through the system filter 20. After processing the element, the WIS and WOS are reset, and the WIS is redirected to coincide with the system delta input 44, 46, 48 of the base filter element 24, 26, 28 servicing the REPLACE transaction type 188. Additionally, a REPLACE transaction is recorded 190 by the same base filter element's system delta output 50, 52, 54.

If the transaction type is CLONE, an UNCLONE transaction is recorded 190 by the system delta output 50, 52, 54 of the base filter element 24, 26, 28 servicing the CLONE transaction type.

If the transaction type is NO CHANGE, the WIS and WOS are not redirected.

After engaging all of the filter elements (both base and bridge) within an element's lifetime, and redirecting the WIS and WOS accordingly, an element may be processed 196 through the system filter 20. If a delta bridge was not created during the redirection of the WIS and WOS 200, processing an element merely comprises the step of copying the element from the WIS to the WOS 202.

If a delta bridge was created during the redirection of the WIS and WOS 200, the "Computer Apparatus and Method for Merging a Sequential Plurality of Delta Streams" described in the U.S. patent application of Squibb may be used to merge the delta elements corresponding to an element 204 with the element's data (as contained in the PIS data stream if the element belongs to the physical element set, or as contained in a system delta 32, 34, 36 if the element belongs to the new-in-scope element set). After performing the merge, the delta bridge is deleted 206.

Regardless of the steps taken in processing an element through the system filter 20, the directory associated with the WOS (either the POS directory or an inverse system delta directory) is updated 208 to reflect the existence of elements in the POS 30 or inverse system delta 38, 40, 42. Also, the WIS and WOS are reset, and engaged filter paths are deleted 210.

While the above discussion has concentrated on the processing of physical and new-in-scope elements, it has touched only briefly on a third type of element, the clone (or duplicate). A clone is an element which, at the time of its creation, comprises the data of another element (a cloned element). It differs in name (metadata) from the elements of the physical and new-in-scope element sets, but comprises data which is identical to that of an element in one of the sets. Clone elements do not appear in either the PIS or new-in-scope directories. Instead, they are entered in a clone table. A clone table traces a clone's dependency to an element from which it was cloned. Clones are not included in the new-in-scope directory since the new-in-scope directory only comprises those elements which have new, unique, and independent data. A clone's data is dependent, not new or unique. Although clone elements could be processed as a distinct set of elements, it is preferred that each clone be processed immediately after the element from which it was cloned 160. This procedure avoids the necessity of seeking for data within a sequential media.

Although sequential medias are nominally seekable (i.e., a tape may be advanced or rewound to a new location), locating a new location on such a media can consume an undue amount of time. For example, advancing to a new location on a magnetic tape requires lifting the tape head, advancing the tape, and then re-engaging the tape head with the tape media. This process can take a few seconds—a very long time in comparison to the nanoseconds with which steps of this method are implemented by a microprocessor. It is therefore desirable to avoid replaying a cloned element which is stored as an element of a stream in a sequential media. This concern may be alleviated by turning on a stream recorder whenever a cloned element is encountered 162. The stream recorder can comprise RAM or some other seekable media which is more efficient at replaying an element (possibly several times). As clones are processed 168, 170 the recorded element may be replayed 222 as many times as is needed to process all of an element's clones.

Figure 8:
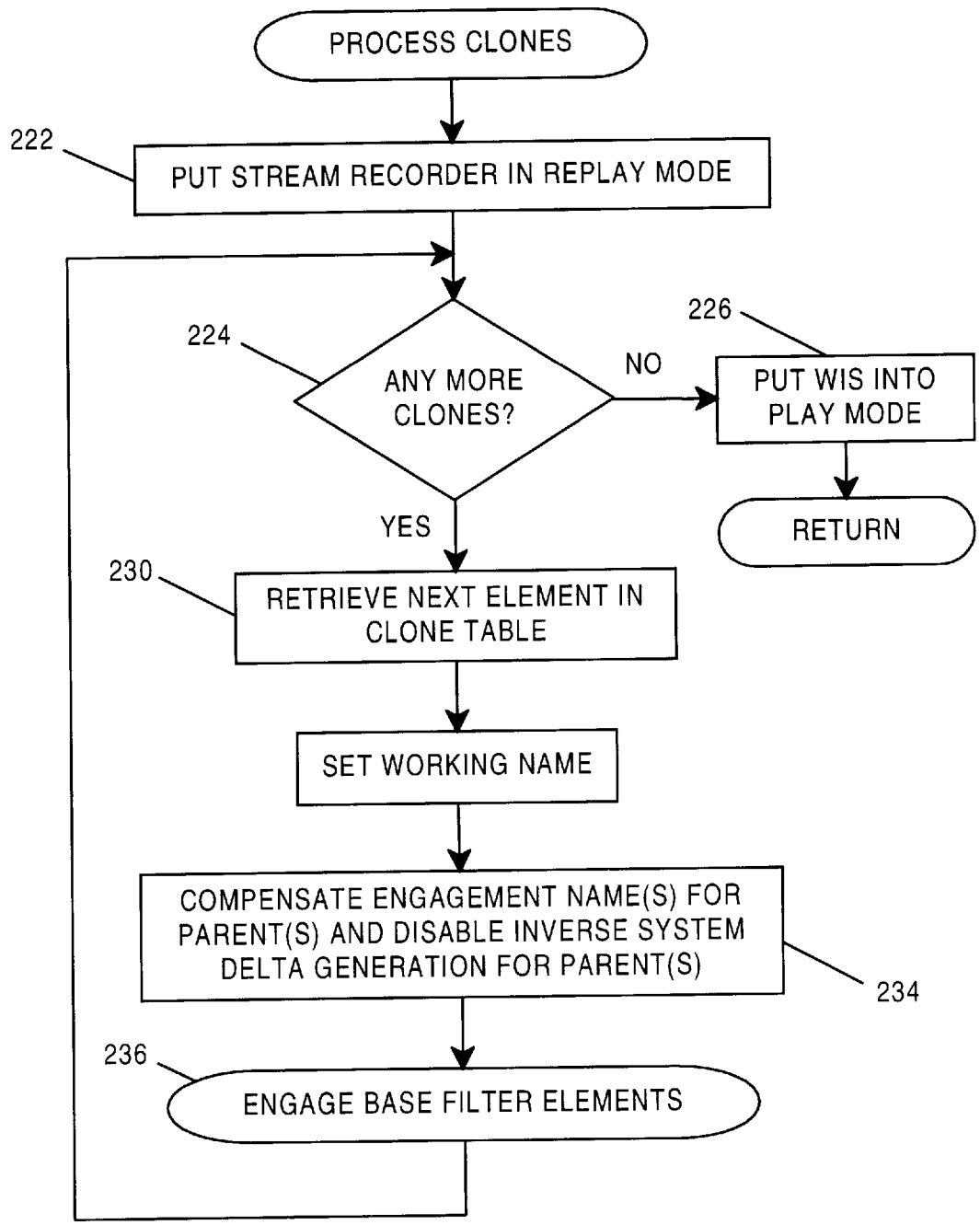
FIG. 8 is a flow of operations used by the method of FIG. 2 in posting referential duplicates of an element.

The processing of clones is described in FIG. 8. The stream recorder is put into replay mode 222, and each clone is processed in turn 230. After processing a clone 236, the WIS and WOS are reset and existing filter paths are deleted 210 so that a new filter path may be constructed. When all clones have been processed 224, the stream recorder may be erased, and the WIS may be put back into play mode 226 before processing another element through the system filter 20.

The processing of a clone element requires some additional redirecting of the WIS 234. Note that the lifetime of a clone element begins with a CLONE transaction. Thus, under the standard method of engaging filter elements and redirecting the WIS (FIG. 5), the WIS is redirected in response to the transaction types applied by each base filter element 24, 26, 28 engaged within a clone's lifetime. This is a necessary procedure, and is carried out according to the previously described steps. However, the processing of a clone element further requires redirection of the WIS in accordance with transaction types corresponding to delta and/or new data information existing prior to the clone's lifetime which has an affect on the data from which the clone depends. The necessity of this step is evident from the fact that a clone element is, by definition, dependent upon the data of another element. For example, consider element A which exists as A0 in the physical element set, but is consecutively updated to A1, A2, A3, and finally, A4. Also consider element B, which is cloned from element A in state 3 (i.e., B3 is a clone of A3), and then updated to B4. Not only does the transaction type corresponding to the B3 to B4 update need to be included in the processing of element B, but also, the transaction types corresponding to the A1–A3 updates need to be included so that B's dependency on the data of element A, prior to state 3, will be reflected in the processing of element B. This extra step in redirecting the WIS is referred to in the Process Clones flow chart as compensating the engagement name(s) for base filter elements which are parents to the base filter element 24, 26, 28 corresponding to a CLONE transaction type. In addition to the extra step of WIS redirection, the processing of a clone requires that inverse system delta generation be disabled for each of the parent base filter elements 24, 26, 28 (those existing prior to the clone's lifetime) engaged during the processing of a clone.

After processing all of the elements of all of the element sets, including those entered in a clone table, a POS 30 representing a revised state of a system's data will have been generated 120 by the system filter's primary output 70. If a forward data merge was undertaken, the POS 30 may be saved for use as a PIS during a subsequent repetition of the method 118.

Figure 10:
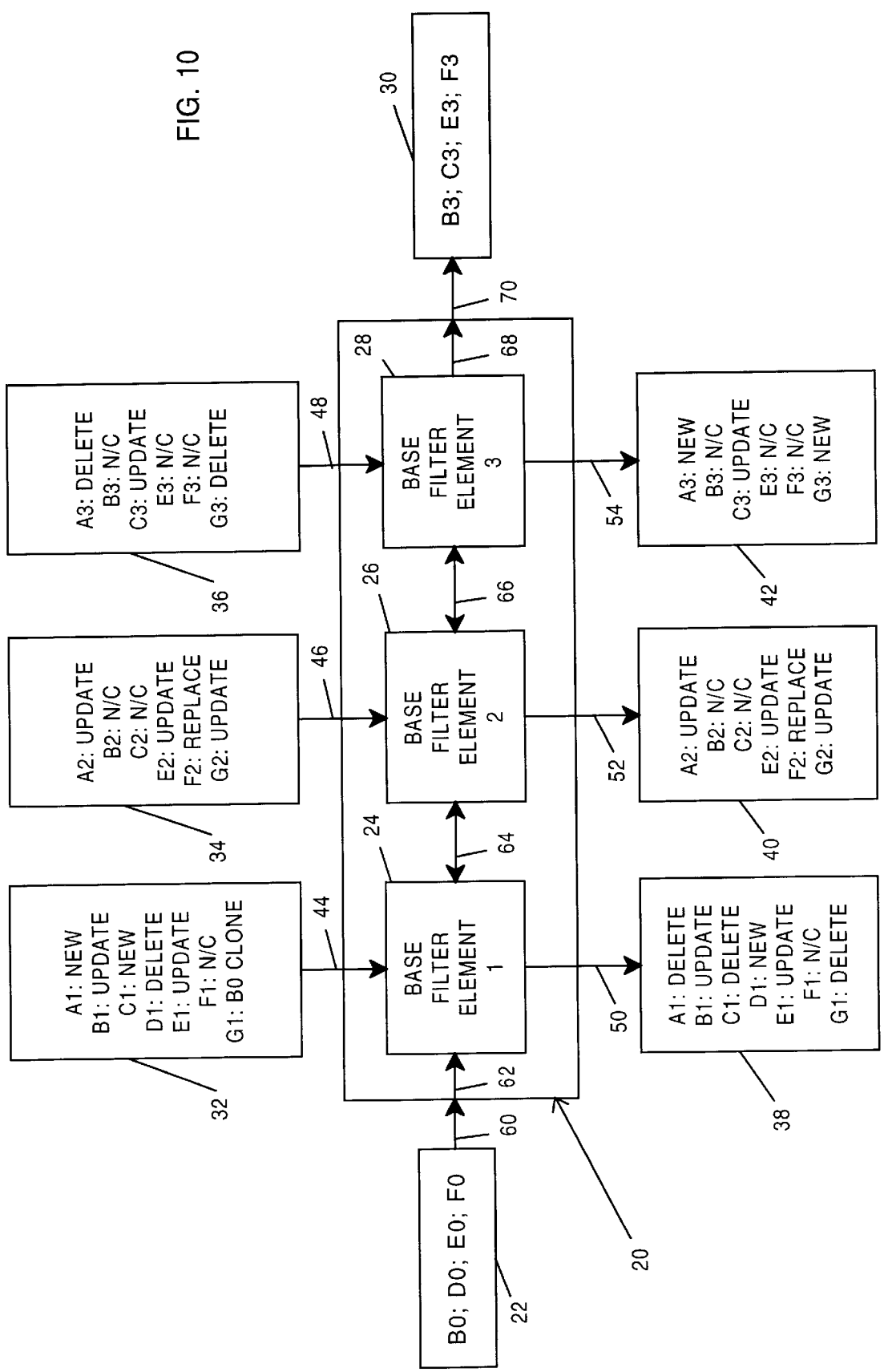
FIG. 10 is an example of a system data merge performed using the system filter of FIG. 1.

Having given a complete description of the apparatus 20 and method for merging system deltas 32, 34, 36, an example might be helpful. FIG. 10 shows a system filter 20 setup, as in FIG. 1. However, the PIS 22 and system deltas 32, 34, 36 have been enhanced to show a set of elements which may be included therein. The POS 30 and inverse system deltas 38, 40, 42 have also been enhanced, to show the information which is written to them during a merge of the PIS 22 and system deltas 32, 34, 36.

The processing of elements through the system filter 20 of FIG. 10 may proceed as follows:

Select the physical element set. Select element B (B0) as the first element in the physical element set. Turn on the stream recorder after noting that B0 has a clone. Engage Base Filter Element 1, configuring the filter element as a bridge filter element. Write an inverse update transaction corresponding to delta element B1 in Inverse System Delta 1. Engage Base Filter Elements 2 and 3, each being within B's lifetime, but servicing no changes to apply to element B0. Process element B through the system filter, writing element B3 to the POS. Select element G1, the clone of B0. Put the stream recorder in replay mode. Record an undone transaction in Inverse System Delta 1. Engage the PIS, as it comprises the data of B0, the element from which clone G1 depends. Engage Base Filter Element 2 servicing an update to G1. Configure Base Filter Element 2 as a bridge filter element, and record an inverse update transaction corresponding to G2 in Inverse System Delta 2. Engage Base Filter Element 3 servicing a delete transaction. Record a new transaction G3 in Inverse System Delta 3, and redirect the WOS to coincide with Inverse System Delta 3. Process element C1, copying the data of element B0, updated by element C2, to Inverse System Delta 3. Select element D (D0). Engage Base Filter Element 1 servicing delete transaction D1. Redirect the WOS to coincide with Inverse System Delta 1, and record a new transaction therein. Copy the data of element D0 from the POS to Inverse System Delta 1. Select element E (E0). Engage Base Filter Elements 2 and 3, configuring them as bridge filter elements. Write inverse update transactions corresponding to E1 and E2 in Inverse System Deltas 1 and 2, respectively. Engage Base Filter Element 3 servicing no change to apply to element E. Process element E0 through the system filter, writing element E3 to the POS. Select element F (F0). Engage Base Filter Element 1 servicing no changes to apply to F0. Engage Base Filter Element 2, servicing a replace transaction specifying that element F1 has been replaced by element F2. Record an inverse replace transaction in Inverse System Delta 2. Redirect the WOS to coincide with Inverse System Delta 2, and copy F0 to Inverse System Delta 2. Reset the system filter, then redirect the WIS to coincide with System Delta 2. Engage base filter element 3 servicing no changes to H2. Copy F2 to the POS as F3. Select the new-in-scope element set. Select element A1, corresponding to Base Filter Element 1, and redirect the WIS to coincide with System Delta 1. Record a delete transaction for A1 in Inverse System Delta 1. Engage Base Filter Element 2, configuring it as a bridge filter element. Record an inverse update transaction in Inverse System Delta 2. Engage Base Filter Element 3 servicing a delete transaction. Redirect the WOS to coincide with Inverse System Delta 3, and record a new transaction corresponding to A3 in Inverse System Delta 3. Process element A1 through the filter, updating it with the information of A2, and then recording the updated A1 in Inverse System Delta 3 as A3. Select element C1 corresponding to Base Filter Element 1, and redirect the WIS to coincide with System Delta 1. Record a delete transaction for C1 in Inverse System Delta 1. Engage Base Filter Element 2, servicing no changes to C1. Engage Base Filter Element 3, configuring it as bridge filter element. Record an inverse update transaction corresponding to C3 in Inverse System Delta 3. Process element C1 through the system filter, recording it in the POS as updated element C3. Acknowledge completion of the POS.

It should be noted that when the components of a PIS and POS are stored on seekable rather than sequential media, a stream relationship among data elements is not required. Thus, system deltas 32, 34, 36 may be polled for delta elements corresponding to an element, and if none exist, an element may be acknowledged as existing before and after a system filter's scope 56, without the necessity of filter engagement for that element.

In a variation of the method, a system delta merge, rather than a system data merge, may be performed. In a system delta merge, a plurality of system deltas 32, 34, 36 (either all forward or all negative) may be merged to create a compiled system delta. A system delta merge is identical to a system data merge but for two changes. First, in performing a system delta merge, the primary input 60 of a system filter 20 is connected to a null device. Second, both data and delta elements may be written into a compiled system delta.

In backing up a computer system, or tracking versions, the method and apparatus 20 may be used on a periodic basis. Furthermore, it may be desirable to archive a PIS 22, along with a number of system deltas 32, 34, 36 within a specified system filter scope 56 of the PIS 22, in an independent and redundant physical storage media. Alternatively, it may be desirable to archive a PIS 22, a number of system deltas 32, 34, 36, any inverse system deltas 38, 40, 42 corresponding to the number of system deltas 32, 34, 36, and a POS 30, in a physical storage media independent from, and redundant to, one or more physical storage medias already containing the PIS 22, the number of system deltas 32, 34, 36, the any inverse system deltas 38, 40, 42 corresponding to the number of system deltas 32, 34, 36, and the POS 30. It might also be desirable to archive a PIS 22 and a number of system deltas 32, 34, 36 in a first physical storage media, independent from, and redundant to, one or more physical storage medias already containing the PIS 22, the number of system deltas 32, 34, 36, any inverse system deltas 38, 40, 42 corresponding to the number of system deltas 32, 34, 36, or a POS 30; and to archive the POS 30 and the any inverse system deltas 38, 40, 42 corresponding to the number of system deltas 32, 34, 36 in a second physical storage media, independent from the first physical storage media, and independent from, and redundant to, one or more physical storage medias already containing the PIS 22, the number of system deltas 32, 34, 36, the any inverse system deltas 38, 40, 42 corresponding to the number of system deltas 32, 34, 36, or the POS 30.

It should be noted that the previous U.S. patent applications of Squibb which are incorporated by reference herein serve only as a foundation upon which a best mode of this invention may be constructed. However, operation of the apparatus 20 and method disclosed herein is not dependent upon the disclosures of the previous U.S. patent applications of Squibb, and the method most certainly works with deltas, delta streams, and methods of merging delta streams other than those disclosed in the previous U.S. patent applications of Squibb.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. In a programmable computer, a method of backing up a newly created data element which is a duplication of an existing data element, the method comprising:
   a) generating a system delta comprising a clone transaction, the clone transaction comprising:
      i) an identifier of the newly created data element; and
      ii) a reference to the existing data element;
      wherein the data content of the newly created data element is the same as the data content of the existing data element; and
   b) storing the system delta in a computer readable medium.

2. In a programmable computer, a method of merging a number of system deltas with a primary input stream to build a primary output stream, said primary input stream being associated with a primary input stream directory, the method comprising:
   a) setting up a system filter;
   b) merging the number of system deltas with the primary input stream, in a single pass of the primary input stream, said merging comprising:
      i) processing each element of a physical element set through the system filter, in an order dictated by the primary input stream directory;
      ii) either before or after i), processing each element of a new-in-scope element set through the system filter.

3. A method as in claim 1, further comprising selecting the primary input stream.

4. A method as in claim 1, wherein the system filter comprises:
   a) a primary input;
   b) a primary output; and
   c) a number of base filter elements corresponding to the number of system deltas, wherein,
      i) each of the number of base filter elements has a system delta input; and
      ii) if more than one base filter element exists, each of the number of base filter elements links to one another to form a sequence of base filter elements between the primary input and the primary output.

5. A method as in claim 1, further comprising reading each of the number of system deltas pursuant to an order established in a corresponding system delta directory.

6. A method as in claim 1, wherein processing each element of the new-in-scope element set through the system filter comprises initiating a request, within the system filter, to process all new-in-scope elements found in the number of system deltas.

7. A method as in claim 1, wherein processing each element of an element set through the system filter comprises processing any clones of an element, immediately after processing the cloned element.

8. A method as in claim 7, wherein processing any clones of an element comprises recognizing a clone transaction type, the clone transaction type comprising:
   a) an identifier of a newly created data element; and
   b) a reference to an existing data element;
   wherein the data content of the newly created data element is the same as the data content of the existing data element.

9. A method as in claim 1, wherein the number of system deltas comprises a plurality of system deltas.

10. A method as in claim 1, wherein the number of system deltas is equal to zero, and the primary output stream is a retrieved primary input stream.

11. A method as in claim 1, further comprising periodically repeating the method.

12. A method as in claim 11, wherein the primary output stream is saved for use as a primary input stream during a subsequent repetition of the method.

13. A method as in claim 1, further comprising reading each of the number of system deltas from a seekable storage media.

14. A method as in claim 1, further comprising reading the primary input stream directly from a sequential storage media.

15. A method as in claim 14, further comprising writing the primary output stream directly to a sequential storage media.

16. A method as in claim 1, further comprising archiving the primary input stream, the number of system deltas, any negative system deltas corresponding to the number of system deltas, and the primary output stream, in a physical storage media independent from one or more physical storage medias already containing the primary input stream, the number of system deltas, the any negative system deltas corresponding to the number of system deltas, and the primary output stream.

17. A method as in claim 1, further comprising:
   a) archiving the primary input stream and the number of system deltas in a first physical storage media, independent from one or more physical storage medias already containing the primary input stream, the number of system deltas, the any negative system deltas corresponding to the number of system deltas, or the primary output stream; and
   b) archiving the primary output stream and the any negative system deltas corresponding to the number of system deltas in a second physical storage media, independent from the first physical storage media, and independent from one or more physical storage medias already containing the primary input stream, the number of system deltas, the any negative system deltas corresponding to the number of system deltas, or the primary output stream.

18. A physical storage media programmed to control a computer in merging a number of system deltas with a primary input stream in a single pass, the media comprising a system filter having:
   a) a primary input;
   b) a primary output; and
   c) a number of base filter elements, corresponding to the number of system deltas, wherein,
      i) each of the number of base filter elements has a system delta input; and ii) if more than one base filter element exists, each of the number of base filter elements links to one another to form a sequence of is base filter elements between the primary input and the primary output.

19. A physical storage media as in claim 18, wherein each of the system filter's number of base filter elements further comprises a system delta output.

20. A computer comprising a system filter, programmed to merge a number of system deltas with a primary input stream in a single pass, the system filter comprising:
   a) a primary input;
   b) a primary output; and
   c) a number of base filter elements, corresponding to the number of system deltas, wherein,
      i) each of the number of base filter elements has a system delta input; and
      ii) if more than one base filter element exists, each of the number of base filter elements links to one another to form a sequence of base filter elements between the primary input and the primary output.

21. A computer as in claim 20, wherein each of the number of system deltas comprises a collection of delta elements representing a change to a system at a discrete system state.

22. A computer as in claim 20, wherein each of the number of system deltas comprises a collection of delta elements representing changes to a system between discrete system states.

23. A computer as in claim 20, wherein each of the system filter's number of base filter elements further comprises a system delta output.

24. In a programmable computer, a method of merging a number of system deltas to create a compiled system delta, the method comprising:
   a) setting up a system filter;
   b) merging the number of system deltas, in a single pass of each of the number of system deltas, said merging comprising:
      i) processing each element of the number of system deltas which corresponds to changes in a physical element set through the system filter, in an order dictated by a primary input stream directory; and
      ii) either before or after i), processing each element of a new-in-scope element set through the system filter.

25. A method as in claim 24, wherein the system filter comprises:
   a) a primary output; and
   b) a number of base filter elements corresponding to the number of system deltas, wherein,
      i) each of the number of base filter elements has a system delta input; and
      ii) if more than one base filter element exists, each of the number of base filter elements links to one another to form a sequence of base filter elements between the primary input and the primary output.

26. A method as in claim 25, wherein setting up the system filter comprises:
   a) determining the system filter's scope and sense;
   b) if the system filter's sense is forward, connecting each forward system delta within the system filter's scope to one of the system delta inputs of the number of base filter elements;
   c) if the system filter's sense is negative, connecting each negative system delta within the system filter's scope to one of the delta inputs of the number of base filter elements; and
   d) configuring the primary output to generate a compiled system delta.

27. A method as in claim 26, further comprising reading each of the number of system deltas pursuant to an order established in a corresponding system delta directory.

28. A method as in claim 27, wherein each base filter element of the number of base filter elements comprises a system delta output.

29. In a programmable computer, a method of creating a number of inverse system deltas corresponding to a number of system deltas, the method comprising:
   a) setting up a system filter;
   b) merging a number of system deltas with a primary input stream, in a single pass of the primary input stream, said merging comprising:
      i) processing each element of a physical element set through the system filter, in an order dictated by a primary input stream directory; and
      ii) either before or after step i), processing each element of a new-in-scope element set through the system filter; and
   d) as each element is being processed through the system filter, recording a number of inverse transaction types, said inverse transaction types corresponding to a number of transaction types contained in said number of system deltas, in the number of inverse system deltas.

* * * * *